US012565065B2

(12) United States Patent
De Pinto et al.

(10) Patent No.: US 12,565,065 B2
(45) Date of Patent: Mar. 3, 2026

(54) DRIVER VEHICLE CONTROL ASSISTANCE

(71) Applicant: McLaren Automotive Limited, Woking (GB)

(72) Inventors: Stefano De Pinto, Barcelona (ES); Aldo Sorniotti, Turin (IT)

(73) Assignee: McLaren Automotive Limited, Woking (GB)

( * ) Notice: Subject to any disclaimer, the term of this patent is extended or adjusted under 35 U.S.C. 154(b) by 104 days.

(21) Appl. No.: 18/383,460

(22) Filed: Oct. 24, 2023

(65) Prior Publication Data

US 2024/0131877 A1 Apr. 25, 2024
US 2024/0227465 A9 Jul. 11, 2024

(30) Foreign Application Priority Data

Oct. 25, 2022 (GB) ...................................... 2215777

(51) Int. Cl.
B60C 23/04 (2006.01)
(52) U.S. Cl.
CPC ................................. B60C 23/0408 (2013.01)
(58) Field of Classification Search
CPC ...... B60W 50/14; B60W 40/09; B60W 50/16; B60W 2300/28; B60W 2510/207; B60W 2520/10; B60W 2520/20; B60W 2520/28; B60W 2530/20; B60C 23/0408
USPC ......................................................... 340/438
See application file for complete search history.

(56) References Cited

U.S. PATENT DOCUMENTS

| | | | | |
|---|---|---|---|---|
| 9,238,467 | B1* | 1/2016 | Hoye | B60W 50/14 |
| 9,475,494 | B1* | 10/2016 | MacArthur | B60W 50/14 |
| 11,433,719 | B1* | 9/2022 | Weston | B60C 23/0433 |
| 11,708,073 | B2* | 7/2023 | Brown | B60W 10/18 |
| | | | | 701/25 |
| 11,945,305 | B2* | 4/2024 | Masoero | G01D 5/20 |
| 11,945,458 | B2* | 4/2024 | Secondi | B60W 40/02 |
| 2016/0321881 | A1* | 11/2016 | Hill | G09B 19/167 |

(Continued)

FOREIGN PATENT DOCUMENTS

| | | |
|---|---|---|
| EP | 3831683 | 6/2021 |
| GB | 2591515 | 8/2021 |

(Continued)

OTHER PUBLICATIONS

Extended European Search Report in European Appln. No. 23205868.5, mailed on Mar. 19, 2024, 11 pages.

(Continued)

*Primary Examiner* — Eric Blount
(74) *Attorney, Agent, or Firm* — Fish & Richardson P.C.

(57) ABSTRACT

A method for assisting a driver in controlling a vehicle, the vehicle comprising a road wheel and at least one vehicle sensor configured to provide vehicle condition data, the road wheel comprising a tyre sensor configured to output tyre operation data, the method comprising: receiving tyre operation data from the tyre sensor during the vehicle being controlled along at least one lap of a track; receiving vehicle condition data from at least one vehicle sensor during the vehicle being controlled along at least one lap of the track; determining, based on the tyre operation data and vehicle condition data, an intervention the driver should make during a future lap of the track; and communicating the intervention to the driver.

23 Claims, 4 Drawing Sheets

(56) References Cited

U.S. PATENT DOCUMENTS

| | | | |
|---|---|---|---|
| 2017/0039870 A1* | 2/2017 | Ellis | G09B 9/04 |
| 2018/0357842 A1* | 12/2018 | Ulsamer | G06T 19/00 |
| 2020/0126448 A1* | 4/2020 | Spano | G06F 3/165 |
| 2020/0184849 A1* | 6/2020 | Spence | B60W 30/18145 |
| 2021/0101603 A1 | 4/2021 | Lee et al. | |
| 2021/0237760 A1* | 8/2021 | Tucker | B60W 30/045 |
| 2021/0276422 A1* | 9/2021 | Masoero | G01D 5/20 |
| 2022/0327870 A1* | 10/2022 | Goto | G07C 5/02 |

FOREIGN PATENT DOCUMENTS

| | | |
|---|---|---|
| GB | 2592036 | 8/2021 |
| KR | 10-2022- 0067579 A | 5/2022 |
| WO | WO 2018231622 | 12/2018 |
| WO | WO 2021/225865 A1 | 11/2021 |

OTHER PUBLICATIONS

Search Report in United Kingdom Appln. No. 2215777.0, mailed Jan. 11, 2023, 5 pages.

Blandina et al., "An Active Safety System Able to Counter Aquaplaning, Integrated with Sensorized Tires, ADAS and 5G Technology for both Human-Driven and Autonomous Vehicles," SAE Technical Paper, Sep. 27, 2020, 1:2020-24-0019, 15 pages.

Extended European Search Report in European Appln. No. 25178037.5, mailed on Nov. 5, 2025, 9 pages.

\* cited by examiner

DRIVER VEHICLE CONTROL ASSISTANCE

CROSS-REFERENCE TO RELATED APPLICATIONS

This application claims priority to GB Patent Application Serial No. 2215777.0, filed on Oct. 25, 2022, the entire contents of which are hereby incorporated by reference.

FIELD OF THE INVENTION

This invention relates to methods for assisting a driver in controlling a vehicle.

BACKGROUND

Vehicles tend to have a level of performance ability which is more than the average driver can usually harness. This is particularly true for high performance vehicles and/or when the vehicles are driven on a track. Drivers can be coached by driving instructors to improve their ability to control a vehicle. However, this can be time consuming and expensive. In addition, it is dependent on the view and skill of the driving instructor as to how the driver progresses. More generally there may be instances where a driver does not know that the vehicle can perform better given the current driving conditions and/or the vehicle abilities.

It would therefore be desirable to have improved methods of assisting a driver in controlling a vehicle.

SUMMARY

According to a first aspect of the present invention there is provided a method for assisting a driver in controlling a vehicle, the vehicle comprising a road wheel and at least one vehicle sensor configured to provide vehicle condition data, the road wheel comprising a tyre sensor configured to output tyre operation data, the method comprising: receiving tyre operation data from the tyre sensor during the vehicle being controlled along at least one lap of a track; receiving vehicle condition data from at least one vehicle sensor during the vehicle being controlled along at least one lap of the track; determining, based on the tyre operation data and vehicle condition data, an intervention the driver should make during a future lap of the track; and communicating the intervention to the driver.

The tyre operation data may comprise contact patch longitudinal load. The tyre operation data may comprise contact patch radial load. The tyre operation data may comprise a tyre identifier. The tyre operation data may comprise contact patch deflection.

The vehicle condition data may describe a load on the body of the vehicle. The vehicle condition data may indicate a current wheel speed of the wheel. The vehicle condition data may indicate a current revolution speed of an engine.

The method may comprise receiving tyre operation data from the tyre sensor during the vehicle being controlled along a plurality of laps of the track. The method may comprise receiving vehicle condition data from at least one vehicle sensor during the vehicle being controlled along a plurality of laps of the track.

Determining, based on the tyre operation data and vehicle condition data, an intervention the driver should make during a future lap of the track may comprise determining excess capacity in braking of the vehicle, based on the tyre operation data and vehicle condition data, at a region along the lap; and the intervention may be to brake harder in that region on the future lap of the track. Determining, based on the tyre operation data and vehicle condition data, an intervention the driver should make during a future lap of the track may comprise determining excess capacity in acceleration of the vehicle, based on the tyre operation data and vehicle condition data, at a region along the lap; and the intervention may be to accelerate harder in that region on the future lap of the track. Determining, based on the tyre operation data and vehicle condition data, an intervention the driver should make during a future lap of the track may comprise determining excess capacity in cornering of the vehicle, based on the tyre operation data and vehicle condition data, at a region along the lap; and the intervention may be to steer harder in that region on the future lap of the track.

Determining, based on the tyre operation data and vehicle condition data, an intervention the driver should make during a future lap of the track may comprise determining an understeer condition, based on the tyre operation data and vehicle condition data, at a region along the lap; and the intervention may be to revise driving style in that region on the future lap of the track. Determining, based on the tyre operation data and vehicle condition data, an intervention the driver should make during a future lap of the track may comprise determining an oversteer condition, based on the tyre operation data and vehicle condition data, at a region along the lap; and the intervention may be to revise driving style in that region on the future lap of the track. The intervention may be to revise driving style in that region on the future lap of the track by reducing vehicle speed during that region. There may be multiple regions along the lap.

Determining, based on the tyre operation data and vehicle condition data, an intervention the driver should make during a future lap of the track may comprise determining a tyre performance capacity, based on the tyre operation data and vehicle condition data, over the lap and when the tyre performance capacity is below a poor performance capacity threshold setting the intervention to undertaking a cool down lap on the future lap of the track. Determining, based on the tyre operation data and vehicle condition data, an intervention the driver should make during a future lap of the track may comprise determining a tyre performance capacity, based on the tyre operation data and vehicle condition data, over the lap and when the tyre performance capacity is above a high performance capacity threshold setting the intervention to undertaking a launch control start on the future lap of the track. Determining, based on the tyre operation data and vehicle condition data, an intervention the driver should make during a future lap of the track may comprise determining a tyre performance capacity, based on the tyre operation data and vehicle condition data, over the lap and when the tyre performance capacity is below a poor performance capacity threshold setting the intervention to undertaking to follow an optimal motion path around the future lap of the track to improve the tyre performance capacity.

The vehicle may comprise a display, and the intervention may be communicated communication to the driver using the display. The vehicle may comprise a speaker, and the intervention may be communicated communication to the driver using the speaker.

According to a second aspect of the present invention there is provided a method for assisting a driver in controlling a vehicle, the vehicle comprising a road wheel and at least one vehicle sensor configured to provide vehicle condition data, the road wheel comprising a tyre sensor configured to output tyre operation data, the method comprising: receiving tyre operation data from the tyre sensor during the vehicle being controlled in motion; receiving vehicle condition data from at least one vehicle sensor during the vehicle being controlled in motion; determining, based on the tyre operation data and vehicle condition data, a weather condition around the vehicle; and where the weather condition is wet, determining an intervention that should be made to the vehicle.

The intervention may be to adjust a vehicle dynamics system to set to a wet weather mode. The method may comprise communicating the intervention to the driver. The method may comprise commanding the vehicle to set the vehicle dynamics system to wet weather mode.

BRIEF DESCRIPTION OF THE DRAWINGS

The present invention will now be described by way of example with reference to the accompanying drawings. In the drawings.

DETAILED DESCRIPTION

The following description is presented to enable any person skilled in the art to make and use the invention, and is provided in the context of a particular application. Various modifications to the disclosed embodiments will be readily apparent to those skilled in the art.

The general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The present invention relates to a method for assisting a driver in controlling a vehicle, the vehicle comprising a road wheel and at least one vehicle sensor configured to provide vehicle condition data, the road wheel comprising a tyre sensor configured to output tyre operation data. The method comprises receiving tyre operation data from the tyre sensor during the vehicle being controlled along at least one lap of a track; and receiving vehicle condition data from at least one vehicle sensor during the vehicle being controlled along at least one lap of the track. The method further comprises determining, based on the tyre operation data and vehicle condition data, an intervention the driver should make during a future lap of the track, and communicating the intervention to the driver.

The present invention also relates to a method for assisting a driver in controlling a vehicle, the vehicle comprising a road wheel and at least one vehicle sensor configured to provide vehicle condition data, the road wheel comprising a tyre sensor configured to output tyre operation data. The method comprises receiving tyre operation data from the tyre sensor during the vehicle being controlled in motion, and receiving vehicle condition data from at least one vehicle sensor during the vehicle being controlled in motion. The method further comprises determining, based on the tyre operation data and vehicle condition data, a weather condition around the vehicle; and where the weather condition is wet, determining an intervention that should be made to the vehicle.

Figure 1:
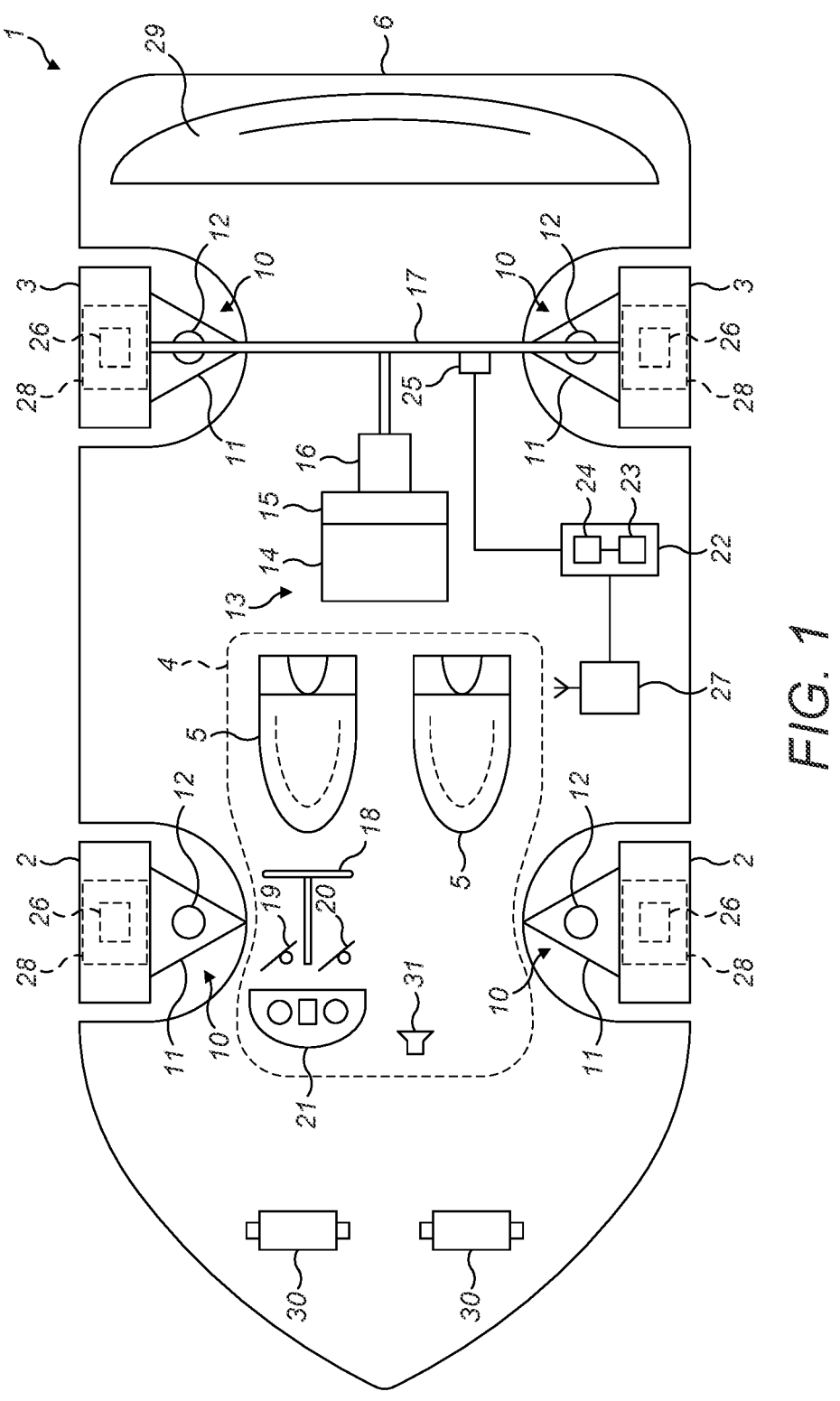
FIG. 1 shows a schematic plan of a vehicle.

FIG. 1 shows a vehicle 1. FIG. 1 shows a plan schematic view of the vehicle 1. The vehicle may be an automobile. The vehicle 1 may be a car. The vehicle comprises front wheels 2 and rear wheels 3. The wheels 2, 3 are road wheels. The front of the vehicle 1 is defined with reference to the primary motion direction of the vehicle 1. The front of the vehicle 1 points in the primary motion direction of the vehicle. Generally, a vehicle has a primary motion direction that is the forward direction. The vehicle 1 comprises an occupant compartment 4. The occupant compartment 4 may comprise one or more seats 5 for occupants of the vehicle to sit in. The occupant compartment may accommodate a driver. The occupant compartment may accommodate one or more passengers.

The vehicle comprises a vehicle body 6. The vehicle body 6 generally comprises a plurality of body panels together with the underlying structure that supports components of the vehicle 1.

Figure 2:
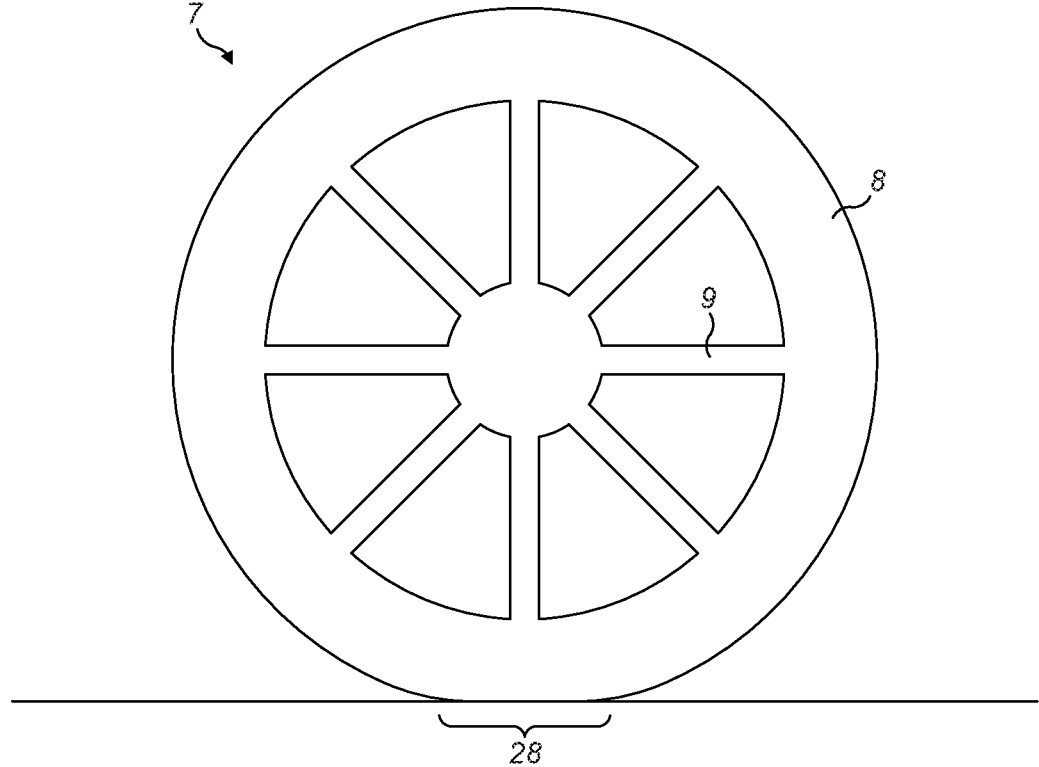
FIG. 2 shows a side view of an example wheel.

The wheels 2, 3 are mounted to the vehicle body 6 so that they can rotate and translate relative to the vehicle body 6. The wheels 2, 3 support the vehicle 1 on a running surface such as a road. In this way, the wheels 2, 3 are road wheels. FIG. 2 shows a side view of an example wheel 7 that may be any of the front or rear wheels 2, 3. The wheel 7 comprises a tyre 8 and a wheel rim 9 to which the tyre 8 is fitted. The wheel rim 9 is configured so that it can be secured to the rest of the vehicle 1. For instance, the wheels 2, 3 are mounted on hub carriers. Thus, each wheel rim 9 is mounted on a hub carrier.

Each wheel can rotate relative to its respective hub carrier about a generally horizontal axis. This rotation axis may be known as the respective rolling axis of the respective wheel 2, 3. The wheels rotate about their respective rolling axes as the vehicle moves along a surface such as the ground due to the wheels contacting the ground and supporting the body of the vehicle against the ground. Each hub carrier is mounted to the body 6 of the vehicle 1 by a suspension mechanism indicated generally at 10. At least some of the wheels may be steerable wheels. The vehicle may comprise a pair of steerable wheels. The steerable wheels may be the front wheels 2. The suspension mechanisms 10 of the steerable wheels 2 are mounted to the hub carriers in such a way that each hub carrier can rotate about a respective steer axis. This thus causes the rolling axis of the wheel that is being steered to rotate about the steer axis.

The suspension mechanism 10 may comprise linkages 11 to connect the hub carrier to the vehicle body 6. The suspension mechanism 10 may comprise one or more suspension components 12 such as springs and/or dampers. The suspension components 12 may provide forces to the linkages 11 to control the motion and/or position of the linkages 11. In this way, the motion and/or position of the wheels 2, 3 relative to the vehicle body 6 can be controlled.

The vehicle 1 comprises a powertrain shown generally at 13. The powertrain 13 may comprise an internal combustion engine 14. The powertrain 13 may comprise one or more electric motors 15. The powertrain 13 may comprise one or more gearboxes 16 to adjust the rotational speed of the internal combustion engine 14 and/or the electric motor(s) 15. The powertrain 13 may be connected to one or more of the wheels 2, 3 by one or more drive shafts 17. In this way the powertrain 13 can drive one or more of the wheels 2, 3. The powertrain 13 may be formed of multiple separate units, each unit driving one or more of the wheels 2, 3. For instance, separate electric motors may individually drive the front wheels 2. In another example, an internal combustion engine 14 may drive the rear wheels 3 optionally with the assistance of one or more electric motors 15. These examples may be combined together. It will be appreciated that there are multiple configurations of powertrain units that may be present in a vehicle 1.

The vehicle 1 may comprise controls located within the occupant compartment 4 to enable an occupant to control the motion of the vehicle 1. One of those controls may be a steering wheel 18. The steering attitude of the wheels 2 is controlled by the steering wheel 18. The steering wheel 18 may be connected to the steered wheels 2 by a steering mechanism so that when the steering wheel 18 is rotated the steered wheels 2 rotate about their respective steer axis. Another of those controls may be a throttle pedal 19. The throttle pedal 19 enables an occupant to provide input on the required torque demanded from the powertrain 13. Generally, the further the throttle pedal 19 is depressed then the greater the torque demand from the driver. Another of those controls may be a brake pedal 20. The brake pedal 20 enables an occupant of to provide input on the braking force required by brakes that are attached to wheels 2, 3.

The vehicle 1 may comprise a display 21 which provides information to the occupants of the vehicle 1. The display 21 may also be referred to as a dashboard. The display 21 may display one or more instruments. The instruments providing information on the current status of the vehicle. For instance, how fast the vehicle is travelling, what gear the vehicle is in, and the speed of rotation of parts of the powertrain such as the internal combustion engine 14. The display 21 may also provide the occupants, and particularly the driver, with information on how to optimally control the vehicle in a given situation. For instance, the display 21 may indicate the optimal moment to change gear. The vehicle may comprise a speaker 31.

The operation of the vehicle is regulated by a Vehicle Control Unit (VCU) 22. The VCU 22 comprises a processor 23 and a non-volatile memory 24. The VCU 22 may comprise more than one processor 23 and more than one memory 24. The memory 24 stores a set of program instructions that are executable by the processor, and reference data such as look-up tables that can be referenced by the processor in response to those instructions. The processor 23 may be configured to operate in accordance with a computer program stored in non-transitory form on a machine readable storage medium. The computer program may store instructions for causing the processor to perform the operations of the VCU 22 in the manner described herein. The VCU 22 may be formed of a number of control units, such an Engine Control Unit, Power Source Control Unit, Gearbox Control Unit, and/or Suspension Control Unit. The VCU 22 is connected to various vehicle components to gather data about the operation of those components. The VCU 22 is connected to various vehicle components to provide control data to those components. The control data influencing the control of the relevant component.

The VCU 22 is connected one or more vehicle sensors 25. The vehicle sensor(s) 25 each provide vehicle condition data. The vehicle condition data that the sensor 25 provides will be dependent on what the sensor 25 is sensing. The vehicle sensors may include:

A wheel speed sensor. The wheel speed sensor provides vehicle condition data that indicates the current wheel speed of the wheel the sensor is associated with. There may be a separate respective wheel speed sensor associated with each wheel of the vehicle.

A gearbox gear sensor. The gearbox gear sensor provides vehicle condition data that indicates the current gear selected by the gearbox.

An engine revolution speed sensor. The engine revolution speed sensor providing vehicle condition data that indicates the current revolution speed of the engine.

A powertrain torque sensor. The powertrain torque sensor provides vehicle condition data that indicates the current output torque of the powertrain. There may be a separate powertrain torque sensor associated with each power source of the powertrain. For instance, a first powertrain torque sensor may be associated with the internal combustion engine and a second powertrain torque sensor may be associated with an electric motor that forms part of the powertrain. Each powertrain torque sensor provides vehicle condition data that indicates the current output torque of the respective power source.

A brake pressure sensor. The brake pressure sensor provides vehicle condition data that indicates the brake pressure of a brake associated with a wheel of the vehicle. There may be separate respective brake pressure sensors for each wheel of the vehicle.

A body force sensor. The body force sensor provides vehicle condition data on the load on the body of the vehicle. The body force sensor may provide vehicle condition data that indicates the lateral acceleration of the vehicle. The body force sensor may provide vehicle condition data that indicates the lateral acceleration of the vehicle. The body force sensor may provide vehicle condition data that indicates the longitudinal acceleration of the vehicle. The body force sensor may provide vehicle condition data that indicates the yaw of the vehicle. The body force sensor may provide more than one of these types of vehicle condition data. The body force sensor may provide all of these types of vehicle condition data. Alternatively, there may be more than one body force sensor which provides at least one of these types of vehicle condition data. The body force sensor may be in the form of an inertial measurement unit.

The VCU 22 controls one or more vehicle dynamics systems within the vehicle. The vehicle dynamics systems control elements of the operation of the vehicle. The vehicle dynamics systems control the operation of components of the vehicle. The vehicle dynamics systems are able to adjust the operation of components of the vehicle so that they operate in a particular way at a particular time. Each vehicle dynamics system may operate according to a respective set of predefined rules which define how the components under the control of the particular vehicle dynamics system operate. The vehicle dynamics systems may include:

A vehicle ride height system. The vehicle ride height system controls the suspension systems 10 of the wheels to adjust the ride height of the vehicle 1. The suspension systems 10 may comprise an adjustable damper is configured to alter its length to adjust the ride height of the vehicle 1. The ride height of the vehicle 1 may be the distance between the body of the vehicle and the running surface that the wheels rest on. The ride height of the vehicle 1 may be the average distance between the body of the vehicle and the running surface. This may be the case where the underside of the vehicle is not level with the running surface.

A stability control system. The stability control system controls the suspension system 10 of the wheels to counter movement of the body of the vehicle. The movement of the vehicle body may be relative to the wheels of the vehicle. The movement of the vehicle body may be caused by dynamic forces acting on the vehicle body during motion of the vehicle. The suspension system 10 may comprise one or more controllable linkages such as dampers. The stability control system may provide control signals to the controllable linkages to stabilise the vehicle at a given moment. The controllable linkages may be controlled to adjust the amount of resistance provided to the suspension system. The stability control system may control the controllable linkages to counter movement of the vehicle body.

A torque vectoring control system. The torque vectoring control system controls the powertrain 13 of the vehicle to provide difference in torque to two or more wheels of the vehicle to provide a steering effect to those wheels. The difference in torque may be generated by causing at least two of the power sources of the powertrain to output different torques at a given moment.

An active aero control system. The vehicle may comprise one or more active aerodynamic devices 29, 30. The aerodynamic devices 29, 30 may be in the form of one or more moveable wings such as a rear wing 29 as pictured in FIG. 1. The aerodynamic device 29, 30 may be in the form of one or more moveable flaps such as front flaps 30 as pictured in FIG. 1. The active aero control system provides inputs to the active aerodynamic devices 29, 30 to cause the active aerodynamic devices to adjust their aerodynamic performance.

A traction control system. The traction control system controls the powertrain 13, brakes and/or differential of the vehicle to control the interaction of the wheels of the vehicle with the running surface. The traction control system controls these vehicle component(s) to attempt to improve the traction between the wheels and the running surface.

The VCU 22 may make use of a Kalman filter to undertake its methods. The Kalman filter is used to predict the state of the vehicle using data received from the vehicle sensors. The VCU 22 controls the vehicle dynamics systems in response to the predicted state of the vehicle.

As described herein, the vehicle comprises a road wheel 2, 3. The road wheel comprises a tyre sensor 26. The tyre sensor 26 is located within the wheel 2, 3. Each wheel may have a tyre sensor 26 associated with it as shown in FIG. 1. The tyre sensor 26 communicates with a tyre sensor receiver 27. The tyre sensor receiver 27 communicates wirelessly with the tyre sensor(s) 26. The tyre sensor(s) are separate to the vehicle sensors.

The tyre sensor 26 analyses the motion of the wheel to generate tyre operation data associated with the wheel. The tyre sensor 26 may analyse the relative motion of the tyre 8 relative to the wheel rim 9 to generate the tyre operational data. The tyre sensor 26 may analyse the interior conditions of the wheel (i.e. the region enclosed by the tyre and the wheel rim) to generate tyre operation data. The tyre sensor 26 may analyse a contact patch 28 associated with the tyre 8 to generate tyre operation data. The contact patch 28 being the portion of the tyre 28 that is in contact with a running surface of the vehicle 1. The tyre sensor 26 may be encoded with a tyre identifier which is provided as tyre operational data. The tyre sensor receiver 27 may process the tyre operational data received from the tyre sensor 26 to translate the data into a form that is readable by the vehicle's systems, such as the VCU 22.

The tyre operation data that the tyre sensor 26 outputs may comprise one or more of the following types of tyre operation data:

Contact patch longitudinal load. The contact patch longitudinal load is the load in the longitudinal direction of the tyre that is being placed on the contact patch of the tyre due to the current operation of the vehicle. The vehicle body 6 via the suspension 10 puts load on to the tyres during movement of the vehicle 1. This load causes forces on the tyre which generate a load in the longitudinal direction of the wheel 2, 3 and hence the tyre.

Contact patch radial load. The contact patch radial load is the load in the radial direction of the tyre that is being placed on the contact patch of the tyre due to the current operation of the vehicle. The radial direction being a line that runs from the contact patch to the rotation axis of the wheel. When the vehicle is stationed on a flat horizontal running surface then the radial load operates in a vertical direction. The vehicle body 6 via the suspension 10 puts load on to the tyres during movement of the vehicle 1. This load causes forces on the tyre which generate a load in the radial direction of the wheel 2, 3 and hence the tyre.

A tyre identifier. The tyre identifier is an identifier for the tyre. It may provide the make and/or model of the tyre.

Current tyre pressure. The current tyre pressure is the air pressure present in the interior region of the tyre. I.e. the region enclosed by the tyre and the wheel rim.

Contact patch deflection. The contact patch deflection is the amount that the contact patch has moved from a normal position. The normal position being the position of the contact patch when the vehicle is stationary and thus under no load. The contact patch deflection is caused by load being put on the tyres during movement of the vehicle 1. The load comes from the vehicle body 6 exerting forces on the tyres during movement of the vehicle 1.

Figure 3:
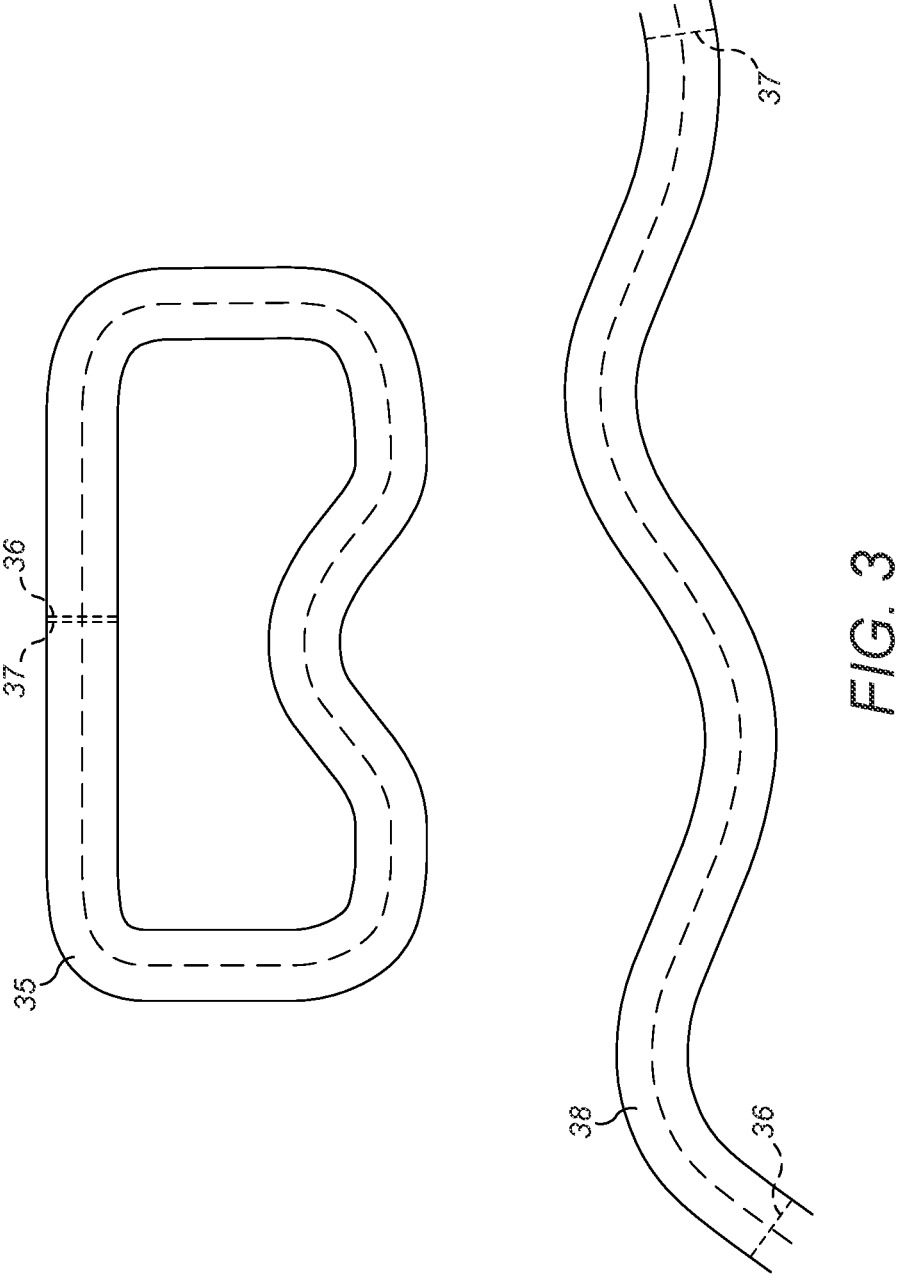
FIG. 3 shows examples of tracks.

One use for a vehicle is to drive the vehicle along a track. FIG. 3 shows two examples of a track. The first track 35 is a closed loop. In this case, the start 36 and the end 37 are in the same place. The second track 38 is an open path. In this case, the start 36 and the end are in different places. In each case, a lap of the track occurs when the vehicle 1 travels from the start 36 to the end 37. The track may be a portion of a larger physical entity on which the vehicle 1 can travel and so may be an open path on a part of a longer track that is a closed path.

Figure 4:
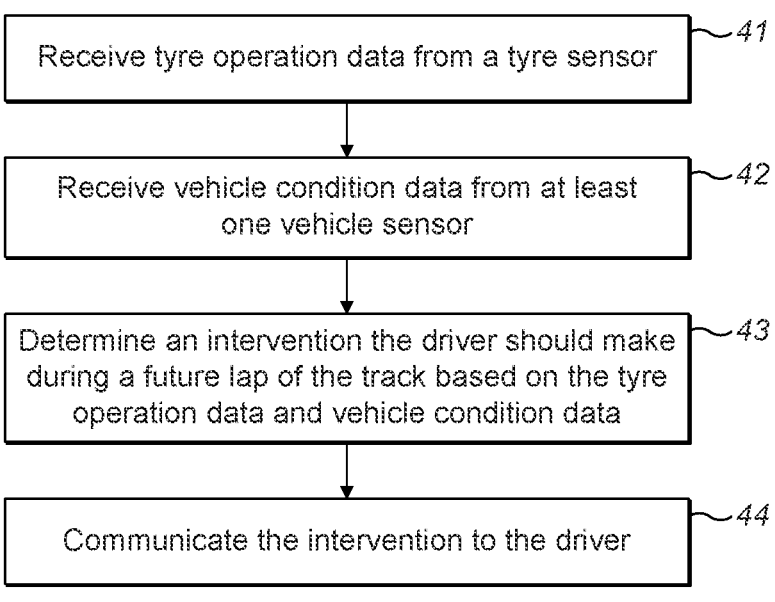
FIG. 4 shows a flowchart of a first method for assisting a driver in controlling a vehicle.

The tyre operational data can be used by the vehicle 1, and in some embodiments the VCU 22, to provide information to a driver controlling the vehicle 1 to attempt to improved the driver's control of the vehicle 1 around the track. Such a method for assisting a driver in controlling a vehicle that may be implemented by the vehicle 1 and potentially the VCU 22, will now be explained with reference to FIG. 4. FIG. 4 shows a flowchart of such a method.

As shown at 41, tyre operation data is received from the tyre sensor. As described herein, the tyre operation data is received by the VCU 22 via the tyre sensor receiver 27. The tyre sensor receiver 27 may process the tyre operation data sent by the tyre sensor to put the tyre operation data in a form that is suitable for the VCU 22 to operate on. In normal operation, the tyre operation data is sent periodically to the VCU 22. Thus, the VCU 22 receives updated tyre operation data over time. The frequency of the sending of the tyre operation data may be such that it is in effect streamed to the VCU 22. I.e. the period between each update is short. The tyre operation data that is received by the VCU 22 may be any of the types of tyre operation data described herein. Some types of tyre operation data may be more static than others which are more variable. In this case some of the tyre operation data may be provided to the VCU 22 with a higher frequency than other types of tyre operation data. For instance, the tyre identifier may only need to be sent when the vehicle starts up, whereas the contact patch longitudinal load may be streamed to the VCU 22.

The tyre operation data is received during the period when the vehicle 1 is being controlled along at least one lap of the track. The vehicle 1 in this instance is being controlled by the driver. The tyre operation data may be received during the vehicle 1 completing a plurality of laps of the track.

As shown at 42, vehicle condition data is received from at least one vehicle sensor. As described herein, the VCU 22 is connected to one or more vehicle sensors to each provide vehicle condition data. In normal operation, the vehicle condition data is sent periodically to the VCU 22. Thus, the VCU 22 receives updated vehicle condition data over time. The frequency of the sending of the vehicle condition data by a particular sensor may be such that it is in effect streamed to the VCU 22. I.e. the period between each update is short. The vehicle condition data that is received by the VCU 22 may be any of the types of vehicle condition data described herein. Some types of vehicle condition data may be more static than others which are more variable. In this case some of the vehicle condition data may be provided to the VCU 22 with a higher frequency than other types of vehicle condition data. For instance, the current gear selected by the gearbox may only need to be sent when the vehicle changes gear, whereas the engine revolution speed may be streamed to the VCU 22.

The vehicle condition data is received during the period when the vehicle 1 is being controlled along at least one lap of the track. The vehicle 1 in this instance is being controlled by the driver. The vehicle condition data may be received during the vehicle completing a plurality of laps of the track.

As shown at 43, an intervention the driver should make during a future lap of the track is determined based on the tyre operation data and the vehicle condition data. The intervention provides instructions to the driver which has the intention of improving the performance of the vehicle on a future lap of the track.

The determination may combine the tyre operation data with the vehicle condition data to determine the current performance of the vehicle whilst being controlled around a lap. One or more regions of the lap may be identified where an improvement in the lap may be achieved by undertaking an intervention by the driver at that location.

The determination based on the tyre operation data and vehicle condition data may be that there is excess capacity in braking of the vehicle in a region along the lap. The excess capacity means that the vehicle could have been commanded to brake harder during that region of the lap whist still retaining grip from the tyres on to the running surface. I.e. the vehicle could have deaccelerated quicker in that region without skidding. The excess capacity may be determined based on the tyre operation data such as the contact patch longitudinal load, the contact patch radial load and/or the contact patch deflection. These give data on how the tyre is performing in that region of the lap. The excess capacity may be determined based on the tyre operation data such as the contact patch longitudinal load, the contact patch radial load and/or the contact patch deflection. The excess capacity may be determined based on the vehicle condition data that describes a load on the body of the vehicle and/or that indicates a current wheel speed of the wheel. Together these sets of data can be used to determine that for a given deacceleration of the vehicle whether tyre deformation was within an acceptable amount. If tyre deformation was within an acceptable amount then a determined amount of extra braking could have taken place. The intervention in this case is therefore to brake harder in that region of the future lap. A slip ratio level may be determined based on the tyre operation data such as the contact patch longitudinal load, the contact patch radial load and/or the contact patch deflection together with vehicle condition data. A longitudinal slip stiffness may be determined based on the tyre operation data such as the contact patch longitudinal load, the contact patch radial load and/or the contact patch deflection together with vehicle condition data. The longitudinal slip stiffness may be the incremental ratio of the longitudinal tyre force with respect to the slip ratio. Excess capacity in braking may be determined based on the slip ratio level, the longitudinal slip stiffness or a combination of the two.

The determination based on the tyre operation data and vehicle condition data may be that there is excess capacity in acceleration of the vehicle in a region along the lap. The excess capacity means that the vehicle could have been commanded to accelerate harder during that region of the lap whist still retaining grip from the tyres on to the running surface. I.e. the vehicle could have accelerated quicker in that region without causing wheel spin. The excess capacity may be determined based on the tyre operation data such as the contact patch longitudinal load, the contact patch radial load and/or the contact patch deflection. These give data on how the tyre is performing in that region of the lap. The excess capacity may be determined based on the tyre operation data such as the contact patch longitudinal load, the contact patch radial load and/or the contact patch deflection. The excess capacity may be determined based on the vehicle condition data that describes a load on the body of the vehicle and/or that indicates a current wheel speed of the wheel. Together these sets of data can be used to determine that for a given acceleration of the vehicle whether tyre deformation was within an acceptable amount. If tyre deformation was within an acceptable amount then a determined amount of extra acceleration could have taken place. The intervention in this case is therefore to accelerate harder in that region of the future lap. A slip ratio level may be determined based on the tyre operation data such as the contact patch longitudinal load, the contact patch radial load and/or the contact patch deflection together with vehicle condition data. A longitudinal slip stiffness may be determined based on the tyre operation data such as the contact patch longitudinal load, the contact patch radial load and/or the contact patch deflection together with vehicle condition data. The longitudinal slip stiffness may be the incremental ratio of the longitudinal tyre force with respect to the slip ratio. Excess capacity in acceleration may be determined based on the slip ratio level, the longitudinal slip stiffness or a combination of the two.

The determination based on the tyre operation data and vehicle condition data may be that there is excess capacity in cornering of the vehicle in a region along the lap. The excess capacity means that the vehicle could have been commanded to corner harder during that region of the lap whist still retaining grip from the tyres on to the running surface. I.e. the vehicle could have changed direction quicker in that region without causing slide slip. The slide slip may be understeer or oversteer. The excess capacity may be determined based on the tyre operation data such as the contact patch longitudinal load, the contact patch radial load and/or the contact patch deflection. These give data on how the tyre is performing in that region of the lap. The excess capacity may be determined based on the tyre operation data such as the contact patch longitudinal load, the contact patch radial load and/or the contact patch deflection. The excess capacity may be determined based on the vehicle condition data that describes a load on the body of the vehicle and/or that indicates a current wheel speed of the wheel. Together these sets of data can be used to determine that for a given amount of cornering of the vehicle whether tyre deformation was within an acceptable amount. If tyre deformation was within an acceptable amount then a determined amount of extra change in direction could have taken place. The intervention in this case is therefore to steer tighter in that region of the lap. Alternatively worded, the intervention in this case is therefore to steer harder in that region of the future lap. The intervention may be to keep the same level of steering but drive faster in that region. A slip ratio level may be determined based on the tyre operation data such as the contact patch longitudinal load, the contact patch radial load and/or the contact patch deflection together with vehicle condition data. A longitudinal slip stiffness may be determined based on the tyre operation data such as the contact patch longitudinal load, the contact patch radial load and/or the contact patch deflection together with vehicle condition data. The longitudinal slip stiffness may be the incremental ratio of the longitudinal tyre force with respect to the slip ratio. Excess capacity in cornering may be determined based on the slip ratio level, the longitudinal slip stiffness or a combination of the two.

The determination based on the tyre operation data and vehicle condition data may be that an understeer condition occurred at a region along the lap. An understeer condition means that there was a loss of grip in the front wheels of the vehicle for a given vehicle speed whilst cornering. The understeer condition may be determined based on the tyre operation data such as the contact patch longitudinal load, the contact patch radial load and/or the contact patch deflection. These give data on how the tyre is performing in that region of the lap. The understeer condition may be determined based on the tyre operation data such as the contact patch longitudinal load, the contact patch radial load and/or the contact patch deflection. The understeer condition may be determined based on the vehicle condition data that describes a load on the body of the vehicle and/or that indicates a current wheel speed of the wheel. Together these sets of data can be used to determine that in a region of the lap whether tyre deformation was outside an acceptable amount which indicates a loss of grip of at least one wheel. An understeer condition may be determined if at least one front wheel has a tyre deformation outside an acceptable amount. The intervention in this case is to revise driving style in that region of the future lap. The revision to driving style may be to achieve a lower vehicle speed during that region of the future lap. The revision to driving style may be to choose a different driving path in that region of the future lap which has a curve with a wider radius. A difference in slip level angle between the front and rear axles may be determined based on the tyre operation data such as the contact patch longitudinal load, the contact patch radial load and/or the contact patch deflection together with vehicle condition data. A cornering stiffness value may be determined based on the tyre operation data such as the contact patch longitudinal load, the contact patch radial load and/or the contact patch deflection together with vehicle condition data. An understeer condition may be determined based on the slip level angle difference, the cornering stiffness value or a combination of the two.

The determination based on the tyre operation data and vehicle condition data may be that an oversteer condition occurred at a region along the lap. An oversteer condition means that there was a loss of grip in the rear wheels of the vehicle for a given vehicle speed whilst cornering. The oversteer condition may be determined based on the tyre operation data such as the contact patch longitudinal load, the contact patch radial load and/or the contact patch deflection. These give data on how the tyre is performing in that region of the lap. The oversteer condition may be determined based on the tyre operation data such as the contact patch longitudinal load, the contact patch radial load and/or the contact patch deflection. The oversteer condition may be determined based on the vehicle condition data that describes a load on the body of the vehicle and/or that indicates a current wheel speed of the wheel. Together these sets of data can be used to determine that in a region of the lap whether tyre deformation was outside an acceptable amount which indicates a loss of grip of at least one wheel. An oversteer condition may be determined if at least one rear wheel has a tyre deformation outside an acceptable amount. The intervention in this case is to revise driving style in that region of the future lap. The revision to driving style may be to achieve a lower vehicle speed during that region of the future lap. The revision to driving style may be to choose a different driving path in that region of the future lap which has a curve with a wider radius. A difference in slip level angle between the front and rear axles may be determined based on the tyre operation data such as the contact patch longitudinal load, the contact patch radial load and/or the contact patch deflection together with vehicle condition data. A cornering stiffness value may be determined based on the tyre operation data such as the contact patch longitudinal load, the contact patch radial load and/or the contact patch deflection together with vehicle condition data. An oversteer condition may be determined based on the slip level angle difference, the cornering stiffness value or a combination of the two.

As will be appreciated, there may be a plurality of regions along the lap where a determination is made and thus an intervention is provided. The intervention may be different for at least some of the regions.

The determination based on the tyre operation data and vehicle condition data may be determining a tyre performance capacity over the lap. The tyre performance capacity indicates what the tyre conditions are and thus what level of performance the tyre can currently operate at. For instance, if the tyre is cold then the compounds that make up the tyre may be operating sub-optimally and so not provide grip at an acceptable level. Likewise, if the tyre is too hot then again the compounds that make up the tyre may be operating sub-optimally and so not provide grip at an acceptable level. In addition, there may be risk of the tyre having a malfunction. The tyre performance capacity may be determined based on the tyre operation data such as the contact patch longitudinal load, the contact patch radial load and/or the contact patch deflection. The tyre performance capacity may be determined based on the vehicle condition data that describes a load on the body of the vehicle and/or that indicates a current wheel speed of the wheel. Together these sets of data can be used to determine the tyre performance capacity over a lap. For instance, the tyre deformation for a given vehicle body load may be determined over the course of the lap. Where the tyre deformation is above a poor deformation threshold then it can be determined that the tyre needs to be cooled down to reach optimum performance. When the tyre performance capacity is below a poor performance capacity threshold then the intervention is set to undertaking a cool down lap on the future lap of the track. The cool down lap is where the vehicle is controlled around the lap at lower speeds.

The determination based on the tyre operation data and vehicle condition data may be determining a tyre performance capacity over the lap. The tyre performance capacity indicates what the tyre conditions are and thus what level of performance the tyre can currently operate at. For instance, if the tyre is within a normal temperature range then the compounds that make up the tyre may be operating optimally and so provide grip at an optimal level. The tyre performance capacity may be determined based on the tyre operation data such as the contact patch longitudinal load, the contact patch radial load and/or the contact patch deflection. The tyre performance capacity may be determined based on the vehicle condition data that describes a load on the body of the vehicle and/or that indicates a current wheel speed of the wheel. Together these sets of data can be used to determine the tyre performance capacity over a lap. For instance, the tyre deformation for a given vehicle body load may be determined over the course of the lap. Where the tyre deformation is below a good deformation threshold then it can be determined that the tyre is operating optimally and can therefore be used with higher performance levels. When the tyre performance capacity is above a high performance capacity threshold then the intervention is set to undertaking a launch control start on the future lap of the track.

The determination based on the tyre operation data and vehicle condition data may be determining a tyre performance capacity over the lap. The tyre performance capacity indicates what the tyre conditions are and thus what level of performance the tyre can currently operate at. For instance, if the tyre is cold then the compounds that make up the tyre may be operating sub-optimally and so not provide grip at an acceptable level. Likewise, if the tyre is too hot then again the compounds that make up the tyre may be operating sub-optimally and so not provide grip at an acceptable level. In addition, there may be risk of the tyre having a malfunction. The tyre performance capacity may be determined based on the tyre operation data such as the contact patch longitudinal load, the contact patch radial load, the contact patch deflection, slip ratio and/or slip angle. The tyre performance capacity may be determined based on the vehicle condition data that describes a load on the body of the vehicle and/or that indicates a current wheel speed of the wheel. Together these sets of data can be used to determine the tyre performance capacity over a lap. For instance, the tyre deformation for a given vehicle body load may be determined over the course of the lap. Where the tyre deformation is above a poor deformation threshold then it can be determined that the tyre needs to be warmed up to reach optimum performance. When the tyre performance capacity is below a poor performance capacity threshold then the intervention is set to undertaking to follow an optimal motion path around the future lap of the track to improve the tyre performance capacity.

As shown at 44, the intervention is communicated to the driver. The intervention may be communicated to the driver using the display 21. For instance, the display 21 may show written instructions to the driver, one or more pictures or a combination of the two. The vehicle 1 may comprise a speaker 31. The intervention may be communicated to the driver using speaker 31. For instance, the speaker may present the intervention to the driver audibly. Potentially using a text to speech conversion. The intervention may be communicated to the driver using a combination of the display 21 and speaker 31.

Figure 5:
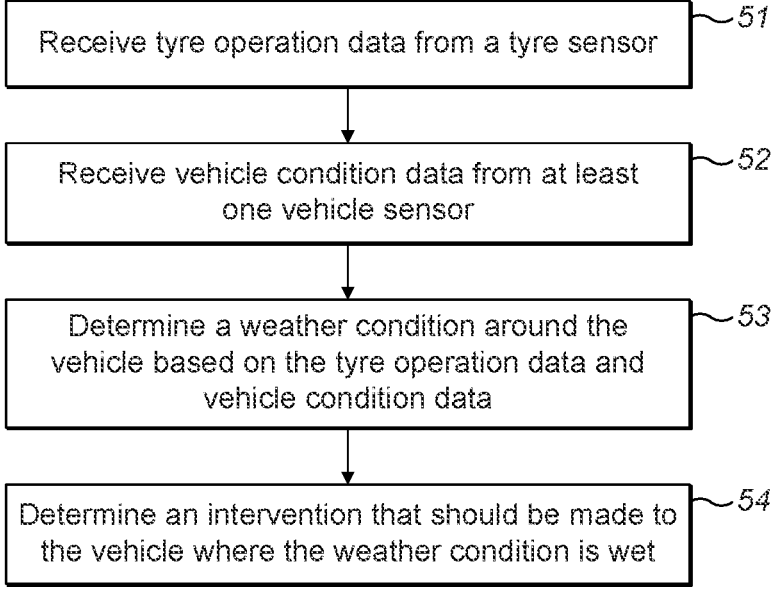
FIG. 5 shows a flowchart of a second method for assisting a driver in controlling a vehicle.

The tyre operational data can be used by the vehicle 1, and in some embodiments the VCU 22, to provide information to a driver controlling the vehicle 1 to attempt to improved the driver's control of the vehicle 1 whilst being controlled in motion. Such a method for assisting a driver in controlling a vehicle that may be implemented by the vehicle 1 and potentially the VCU 22, will now be explained with reference to FIG. 4. FIG. 5 shows a flowchart of such a method.

As shown at 51, tyre operation data is received from the tyre sensor. As described herein, the tyre operation data is received by the VCU 22 via the tyre sensor receiver 27. The tyre sensor receiver 27 may process the tyre operation data sent by the tyre sensor to put the tyre operation data in a form that is suitable for the VCU 22 to operate on. In normal operation, the tyre operation data is sent periodically to the VCU 22. Thus, the VCU 22 receives updated tyre operation data over time. The frequency of the sending of the tyre operation data may be such that it is in effect streamed to the VCU 22. I.e. the period between each update is short. The tyre operation data that is received by the VCU 22 may be any of the types of tyre operation data described herein. Some types of tyre operation data may be more static than others which are more variable. In this case some of the tyre operation data may be provided to the VCU 22 with a higher frequency than other types of tyre operation data. For instance, the tyre identifier may only need to be sent when the vehicle starts up, whereas the contact patch longitudinal load may be streamed to the VCU 22.

The tyre operation data is received during the period when the vehicle 1 is being controlled in motion. The vehicle 1 in this instance is being controlled by the driver.

As shown at 52, vehicle condition data is received from at least one vehicle sensor. As described herein, the VCU 22 is connected to one or more vehicle sensors to each provide vehicle condition data. In normal operation, the vehicle condition data is sent periodically to the VCU 22. Thus, the VCU 22 receives updated vehicle condition data over time. The frequency of the sending of the vehicle condition data by a particular sensor may be such that it is in effect streamed to the VCU 22. I.e. the period between each update is short. The vehicle condition data that is received by the VCU 22 may be any of the types of vehicle condition data described herein. Some types of vehicle condition data may be more static than others which are more variable. In this case some of the vehicle condition data may be provided to the VCU 22 with a higher frequency than other types of vehicle condition data. For instance, the current gear selected by the gearbox may only need to be sent when the vehicle changes gear, whereas the engine revolution speed may be streamed to the VCU 22.

The vehicle condition data is received during the period when the vehicle 1 is being controlled in motion. The vehicle 1 in this instance is being controlled by the driver.

As shown at 53, a weather condition around the vehicle is determined based on the tyre operation data and vehicle condition data. The weather condition may be determined based on the tyre operation data such as the contact patch longitudinal load, the contact patch radial load and/or the contact patch deflection. The weather condition may be determined based on the vehicle condition data that describes a load on the body of the vehicle and/or that indicates a current wheel speed of the wheel. Together these sets of data can be used to determine the weather condition.

For instance, the tyre deformation for a given vehicle body load may be determined over a period of time. Where the tyre deformation is below a deformation threshold for a given body load then it can be determined that the tyre has less grip than usual and so it is likely that the road surface is wet.

As shown at 54, an intervention is determined to be made to the vehicle in response to the weather condition being determined as being wet. The intervention may be to adjust a vehicle dynamics system to set a wet weather mode. For instance, the traction control system may be set to a wet weather mode. The intervention may be communicated to the driver for the driver to act on. Alternatively, the vehicle and potentially the VCU 22 may set the wet weather mode automatically in response to the determination.

The system and methods described herein use data provided from vehicle sensors together with data provided from tyre sensors to provide a better estimate of the current state of the vehicle. This better estimate permits a better guide to be able to be provided to the driver of the vehicle 1.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

The invention claimed is:

1. A method for assisting a driver in controlling a vehicle, the vehicle comprising a road wheel and at least one vehicle sensor configured to provide vehicle condition data, the road wheel comprising a tyre sensor configured to output tyre operation data, the method comprising:

receiving tyre operation data from the tyre sensor during the vehicle being controlled along at least one lap of a track, the tyre operation data comprising contact patch longitudinal load and contact patch radial load;

receiving vehicle condition data from at least one vehicle sensor during the vehicle being controlled along at least one lap of the track;

determining, based on the tyre operation data and vehicle condition data, an intervention the driver should make during a future lap of the track; and communicating the intervention to the driver.

2. A method according to claim 1, wherein the tyre operation data comprises a tyre identifier; and wherein the tyre operation data comprises contact patch deflection.

3. A method according to claim 1, wherein the vehicle condition data describes a load on the body of the vehicle; wherein the vehicle condition data indicates a current wheel speed of the wheel; and wherein the vehicle condition data indicates a current revolution speed of an engine.

4. A method according to claim 1, the method comprising receiving tyre operation data from the tyre sensor during the vehicle being controlled along a plurality of laps of the track; and receiving vehicle condition data from at least one vehicle sensor during the vehicle being controlled along a plurality of laps of the track.

5. A method according to claim 1, wherein determining, based on the tyre operation data and vehicle condition data, an intervention the driver should make during a future lap of the track comprises determining excess capacity in braking of the vehicle, based on the tyre operation data and vehicle condition data, at a region along the lap; and the intervention is to brake harder in that region on the future lap of the track.

6. A method according to claim 1, wherein determining, based on the tyre operation data and vehicle condition data, an intervention the driver should make during a future lap of the track comprises determining excess capacity in acceleration of the vehicle, based on the tyre operation data and vehicle condition data, at a region along the lap; and the intervention is to accelerate harder in that region on the future lap of the track.

7. A method according to claim 1, wherein determining, based on the tyre operation data and vehicle condition data, an intervention the driver should make during a future lap of the track comprises determining excess capacity in cornering of the vehicle, based on the tyre operation data and vehicle condition data, at a region along the lap; and the intervention is to steer harder in that region on the future lap of the track.

8. A method according to claim 1, wherein determining, based on the tyre operation data and vehicle condition data, an intervention the driver should make during a future lap of the track comprises determining an understeer condition, based on the tyre operation data and vehicle condition data, at a region along the lap; and the intervention is to revise driving style in that region on the future lap of the track.

9. A method according to claim 1, wherein determining, based on the tyre operation data and vehicle condition data, an intervention the driver should make during a future lap of the track comprises determining an oversteer condition, based on the tyre operation data and vehicle condition data, at a region along the lap; and the intervention is to revise driving style in that region on the future lap of the track.

10. A method according to claim 8, wherein the intervention is to revise driving style in that region on the future lap of the track by reducing vehicle speed during that region.

11. A method according to claim 5, wherein there are multiple regions along the lap.

12. A method according to claim 1, wherein determining, based on the tyre operation data and vehicle condition data, an intervention the driver should make during a future lap of the track comprises determining a tyre performance capacity, based on the tyre operation data and vehicle condition data, over the lap and when the tyre performance capacity is below a poor performance capacity threshold setting the intervention to undertaking a cool down lap on the future lap of the track.

13. A method according to claim 1, wherein determining, based on the tyre operation data and vehicle condition data, an intervention the driver should make during a future lap of the track comprises determining a tyre performance capacity, based on the tyre operation data and vehicle condition data, over the lap and when the tyre performance capacity is above a high performance capacity threshold setting the intervention to undertaking a launch control start on the future lap of the track.

14. A method according to claim 1, wherein determining, based on the tyre operation data and vehicle condition data, an intervention the driver should make during a future lap of the track comprises determining a tyre performance capacity, based on the tyre operation data and vehicle condition data, over the lap and when the tyre performance capacity is below a poor performance capacity threshold setting the intervention to undertaking to follow an optimal motion path around the future lap of the track to improve the tyre performance capacity.

15. A method according to claim 1, wherein the vehicle comprises a display, and the intervention is communicated communication to the driver using the display.

16. A method according to claim 1, wherein the vehicle comprises a speaker, and the intervention is communicated communication to the driver using the speaker.

17. A method for assisting a driver in controlling a vehicle, the vehicle comprising a road wheel and at least one vehicle sensor configured to provide vehicle condition data, the road wheel comprising a tyre sensor configured to output tyre operation data, the method comprising:

receiving tyre operation data from the tyre sensor during the vehicle being controlled in motion, the tyre operation data comprising contact patch longitudinal load and contact patch radial load;

receiving vehicle condition data from at least one vehicle sensor during the vehicle being controlled in motion;

determining, based on the tyre operation data and vehicle condition data, a weather condition around the vehicle; and where the weather condition is wet, determining an intervention that should be made to the vehicle.

18. A method according to claim 17, wherein the intervention is to adjust a vehicle dynamics system to set to a wet weather mode.

19. A method according to claim 17, the method comprising communicating the intervention to the driver.

20. A method according to claim 17, the method comprising commanding the vehicle to set the vehicle dynamics system to a wet weather mode.

21. A method for assisting a driver in controlling a vehicle, the vehicle comprising a road wheel and at least one vehicle sensor configured to provide vehicle condition data, the road wheel comprising a tyre sensor configured to output tyre operation data, the method comprising:

receiving tyre operation data from the tyre sensor during the vehicle being controlled in motion;

receiving vehicle condition data from at least one vehicle sensor during the vehicle being controlled in motion;

determining, based on the tyre operation data and vehicle condition data, a weather condition around the vehicle; and where the weather condition is wet, determining an intervention that should be made to the vehicle;

wherein the intervention is to adjust a vehicle dynamics system to set to a wet weather mode.

22. A method according to claim 21, the method comprising communicating the intervention to the driver.

23. A method according to claim 21, the method comprising commanding the vehicle to set the vehicle dynamics system to the wet weather mode.

* * * * *